United States Patent [19]

Acoveno et al.

[11] 3,883,348

[45] May 13, 1975

[54] PROCESS FOR THE REMOVAL OF SULFUR FROM BATTERY WRECKER MATERIAL USING AMMONIUM CARBONATE SOLUTION

[75] Inventors: Floyd A. Acoveno; Thomas W. Freudiger, both of Dallas, Tex.

[73] Assignee: R.S.R. Corporation, Dallas, Tex.

[22] Filed: Sept. 6, 1973

[21] Appl. No.: 394,837

[52] U.S. Cl. .................. 75/103; 75/120; 423/89; 423/92; 423/98; 423/420; 423/434; 423/548
[51] Int. Cl. . C22b 13/04; C01g 21/02; C01g 21/14
[58] Field of Search .......... 75/103, 120; 423/89, 92, 423/98, 434

[56] References Cited
UNITED STATES PATENTS

| 715,214 | 12/1902 | Ramage | 423/92 |
|---|---|---|---|
| 1,148,062 | 7/1915 | Zeuker | 423/98 |
| 1,570,438 | 1/1926 | Evans | 423/89 |
| 1,738,081 | 12/1929 | Smith | 423/434 |
| 1,898,405 | 2/1933 | Svendsen | 423/92 |
| 2,187,749 | 1/1940 | Marvin | 423/434 |
| 3,689,253 | 9/1972 | Dorenfeld et al. | 75/120 X |

Primary Examiner—Herbert T. Carter
Attorney, Agent, or Firm—Howard E. Moore; Gerald G. Crutsinger

[57] ABSTRACT

A process for the conversion of waste battery scrap materials containing lead sulfate comprising an initial leaching operation to convert such lead sulfate to lead carbonate while at the same time converting the aqueous ammonium carbon solution to ammonium sulfate. Such is followed by filtration to thus separate soluble ammonium sulfate from the insoluble lead carbonate. The ammonium sulfate is then suitably crystallized resulting in a commercial product, namely, a useful fertilizer compound. The lead carbonate referred to in the foregoing is decomposed by application of heat to produce lead oxide and carbon dioxide, the latter then being reacted with aqueous ammonia to produce more ammonium carbonate solution for another beginning leach cycle. The advantages of the system reside in the reduction of emission of noxious sulfur oxides ($SO_x$) in an amount from at least about 80 to 90 percent while at the same time producing a useful commercial product, ammonium sulfate.

10 Claims, 2 Drawing Figures

PROCESS FOR THE REMOVAL OF SULFUR FROM BATTERY WRECKER MATERIAL USING AMMONIUM CARBONATE SOLUTION

BACKGROUND OF THE INVENTION AND PRIOR ART

As indicated in the foregoing Abstract, this invention is primarily concerned with a novel process for the recovery of valuable materials from the lead-containing residue of certain types of storage batteries typically and more generally used as a voltage source for automobile engine starting and ignition purposes. These accumulators or batteries are commonly of the lead plate type; i.e., utilizing electrodes consisting of lead compounds. The electrolyte in such type of storage battery is generally dilute sulfuric acid. The plates themselves generally comprise negative or cathode plates consisting of lead sulfate with these interspersed or opposed by a plate or plates representing the positive anode consisting of lead oxide. Over a period of time, although such storage cells have a relatively long life, continued usage, even with constant recharging, causes a precipitate or residue to form from this sort of accumulator system. Such residue in the art is commonly called "paste" or "mud." Primarily consisting of lead sulfate, as a "peel-off" from the plates, this paste or mud is recoverable, and in the present process the purpose is to recover same as usable lead oxide (ultimately refined to pure or metallic lead) in a system or method whereby such noxious fumes as certain sulfur oxides, and unlike prior processes, are not emitted to the atmosphere. Hence, the method exhibits extreme utility from the ecology standpoint — an ever present concern of chemical systems or processes of not inconsiderable commercial size.

With regard to the referred to types of lead plates as identified in the foregoing, it has long been recognized that the so-called battery waste which ultimately results from continued usage does include primarily lead sulfate, lead peroxide or oxide and a water solution of sulfuric acid in various amounts of concentration. The Tucker No. 1,148,062 patent, issued at an early date, recognizes the problems consequent upon recovery of lead sulfate from such waste materials. However, this patent, as is common with other prior art, is not directed to a recovery method which assures a large volume of recovery of the valuable lead oxide consistent with non-emission or non-production of ordinarily produced noxious fumes such as certain sulfur oxides.

Similarly, various prior systems have recognized the desirability of the conversion of spent battery plate into litharge — a form of lead monoxide and as represented for example by the Cole Pat. No. 2,139,069. Here again, however, prior art adventurers such as the latter do not divulge applicants' novel system and particularly applicants' novel concept of not only recovery of the valuable lead component but recovery thereof without production of noxious fumes which would ordinarily be emitted into the atmosphere to add to the present day problems of air pollution. In addition, applicants' procedure represents a basic and inventive departure over such prior schemes in that a valuable by-product is obtained and also in that the system includes reuse by recycling to the initial leaching stage of certain inorganic components, particularly carbon dioxide, utilized in carrying out the method of this invention.

As more particularly described in the following, an initial leaching step in the present process does convert lead sulfate to lead carbonate and again, there have been presented to the art known procedures to obtain that fundamental conversion. See, for example, the Smith Pat. No. 1,738,081 which, however, is again confined to that specific fundamental reaction without going further and without disclosing or indicating any method or process comparable to that of the present invention, and as directed to the further steps as herein described. As to the latter, such enable not only conversion to lead carbonate or lead oxide, with ultimate reduction to metallic lead, but accomplishment of this desired result without emanation of noxious fumes. Such also enables recovery of a valuable by-product — ammonium sulfate, the latter being utilizable as a fertilizer chemical or component.

It is obvious in referring to such "battery wastes" as mentioned above that the same, in the context of this invention, represent only those wastes consisting of lead sulfate, or oxide or peroxide compounds present in the paste or mud herein referred to. Actually, when used storage batteries are turned into scrap the various components thereof are initially separated into not only those paste residues but into the following additional materials — i.e., certain amounts of metallic lead, the battery case material itself which usually consists of rubber or plastic or like equivalent, and finally, the acid electrolyte, usually sulfuric acid. But with regard to this invention, as indicated, the same is directed only to the first fraction, i.e., the lead sulfate containing material. In this regard the process can, however, be utilized in connection with any known source of lead sulfate. For example, lead ore itself, with suitable pretreatment, could also represent a suitable feed stock for the instant process.

SUMMARY AND OBJECTS OF THE INVENTION

Our invention may be summarized as being directed to a novel process for treatment of the so-called paste and mud recovered from waste batteries to firstly convert the lead sulfate therein to lead carbonate, then in an alternate embodiment, to ultimately convert that carbonate to lead oxide furnace feed stock, this being accomplished without production of noxious sulfur oxide fumes.

The referred to waste materials are first agitated in a solution of ammonium carbonate to produce ammonium sulfate and lead carbonate, this being a well understood chemical reaction. The resultant slurry is then subjected to filtration to separate the solids from the liquid. These resultant solids are heated to thus decompose the lead carbonate into lead oxide (FIG. 1), the latter representing furnace feed for final reduction to metallic lead.

Such $CO_2$ as is released during the carbonate decomposition stage is introduced to a condenser-absorber zone where $CO_2$ and ammonia are added in make-up quantities. The resulting ammonium carbonate from the $CO_2$ recovery zone is passed back or recycled to the leach solution.

As to the liquid resulting from the above-identified filtration separation stage, such is converted by said crystallization stage into ammonium sulfate, the gases from this reaction being passed back to the condenser-absorber stage. The ammonium sulfate referred to above is filtered in a centrifuge to form wet ammonium sulfate crystals which are then dried, enabling their use as a valuable by-product. In the obtaining of the ultimate lead oxide (or carbonate) feed stock, the desirable end result of the process is to not only reduce the emission of sulfur oxides by about 80 to 90 percent but also to obtain said by-product, ammonium sulfate, which is of commercial value as a fertilizer. This latter factor naturally results in substantial reduction in overall commercial operation of the process.

From the foregoing, it will be appreciated that a primary objective of this invention is to convert battery waste material containing lead sulfate into reusable lead oxide suitable for furnace feed whereby such oxide is reduced ultimately to metallic lead. In this same context an alternate procedure of the invention is to produce the more complex lead carbonate which in turn is also suitable for furnace feed in the ultimate production of metallic lead.

Another objective of the invention is to provide a process wherein there is a substantial reduction in emission of noxious fumes such as certain $SO_x$ or sulfur oxides.

An additional object of the invention, and in line with the just stated objective, is the conversion of such sulfur components as may be present in practice of the process to ammonium sulfate. The latter comprises a valuable and commercial by-product useful as a fertilizer component. In this regard, it is evident that such conversion to ammonium sulfate eliminates sulfur emission simply by that conversion reaction.

An additional and vital objective of the invention is the provision of a process of the foregoing type which creates its own production of $CO_2$ used in turn by suitable reaction to obtain ammonium carbonate that is recycled to the initial leach stage. In one instance (FIG. 1), such $CO_2$ is obtained from the solids decomposition step; fed into what we term to be a gas recovery zone where it there reacts with $NH_3$ to form ammonium carbonate for such recycle. In the other version of the invention (FIG. 2), the $CO_2$ is obtained from the combustion products of a fuel-air mixture that is combusted to heat the ammonium sulfate recovery vessel. In either eventuality, the carbon dioxide is, as stated, produced within one or the other stages of the process and used to form $(NH_4)_2CO_3$, with the latter being fed back to the leach stage.

Finally, an additional object of the invention, and of substantial advantage to the art, is the provision of a process for the conversion of lead sulfate battery waste material which is not only economically attractive, but most suitably adapted to large scale commercial operation at minimum cost and maximum financial return.

DESCRIPTION OF THE DRAWINGS

In FIG. 2, the carbon dioxide is recovered from the combustion gases emanating from the combustion stage of the ammonium sulfate solids recovery system, this modification being herein referred to as the open system of $CO_2$ recovery and in contrast to the herein referred to closed system depicted in FIG. 1. The ultimate output of this open circuit method is lead carbonate furnace feed.

MORE PARTICULAR DESCRIPTION OF THE INVENTION

As more generally set forth above, the process of the instant invention involves the leaching of impure lead bearing materials, particularly such as those containing lead sulfate, to convert and recover the lead as either the oxide thereof or as lead carbonate. The feed stream containing such lead-containing materials (as $PbSO_4$) is initially admitted to a leaching zone wherein the same are leached with a solution containing ammonium carbonate. Following this, the leach slurry is then admitted to a liquid-solids separator where the involved solids, the lead containing and particulate materials are removed, then sent to a thermal decomposition stage. The latter is herein referred to as a closed, indirect heat exchange system of $CO_2$ recovery, and as more particularly referred to hereinafter by reference to FIG. 1. In this last referred to decomposition stage, the admitted and formed lead carbonate from the preceding phase is converted to lead oxide with carbon dioxide being produced as a result of the decomposition reaction. The remaining ammonium sulfate solution, free of lead or the inorganic lead composite, is then admitted to a stage which we prefer to identify as a solids/gas separation stage. Here ammonium sulfate solids are recovered and the contained water plus any excess ammonia and/or $CO_2$ are recycled to the gas recovery system or zone as above referred to.

The gas stream containing ammonia is joined by the $CO_2$ recycle stream and same further joined by makeup streams containing $CO_2$ and ammonia, the latter in that amount necessary for proper leaching in the initial stage. These latter components, in other words, form ammonium carbonate for recycle to the leach solution in the requisite amount necessary for such latter operation.

Lead bearing feed materials that may be treated in the process of the invention include not only impure lead sulfate compounds but also lead oxide-sulfate mixtures. Lead sulfide containing materials can also be treated after a roasting pretreatment stage, not herein particularly described but well known to the art.

Figure 1:
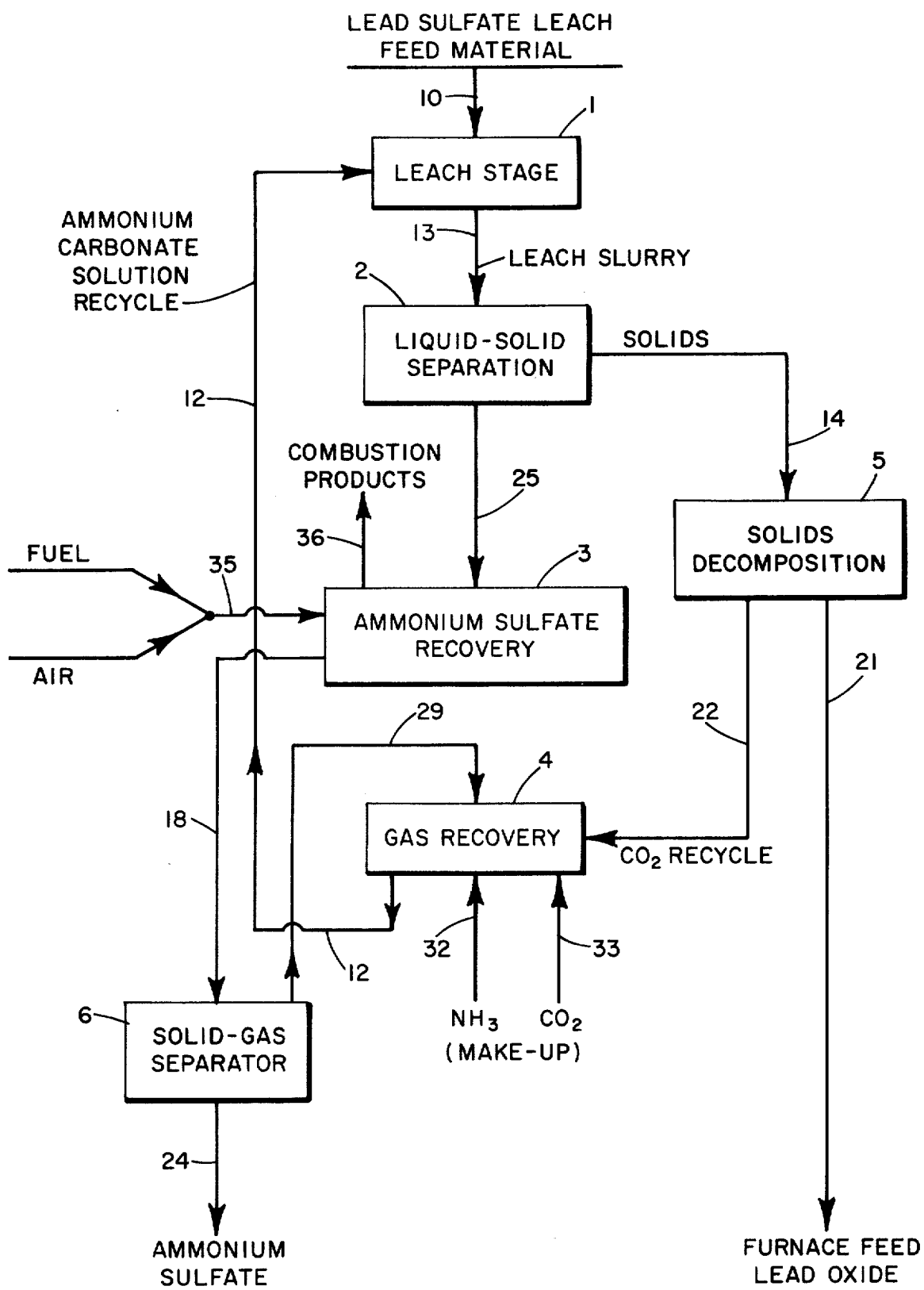
FIG. 1 is a flow sheet or block diagram of one embodiment of the process of the invention in which the carbonated solids of the leach stage are thermally decomposed into lead oxide plus gaseous carbon dioxide, the latter being recycled as there indicated. This embodiment of the invention is preferably herein referred to as a closed, indirect heat exchange system for $CO_2$ recovery. The ultimate output of this closed circuit method is lead oxide furnace feed.
Figure 2:
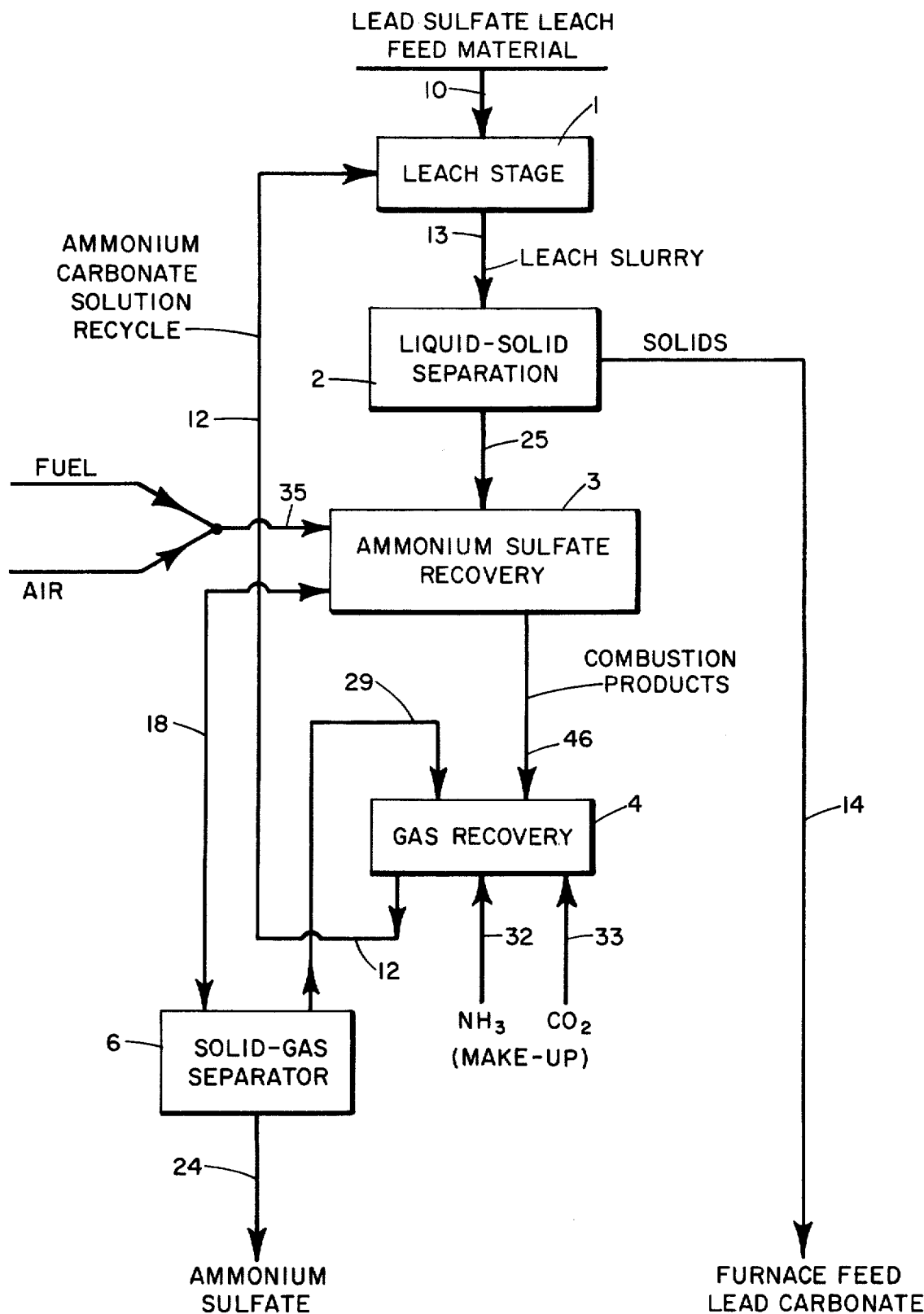
FIG. 2, again representative of a flow sheet or block diagram, illustrates a modification of the process or method shown in FIG. 1.

The operations of both the "closed" and the "open" system of the invention are described in detail below and with regard to the two flow sheets of FIGS. 1 and 2, bearing in mind that FIG. 1 relates to the production of a lead oxide furnace feed by reason of the break down of lead carbonate in the final stage, whereas FIG. 2 represents the process wherein the produced lead carbonate itself remains unconverted to lead oxide, yet does constitute a suitable furnace feed for break down into the ultimate metallic lead. In both systems, there is involved the important facet of $CO_2$ recycle, although the source of $CO_2$ in each instance is different.

In the operation of the closed, indirect heat exchange system as represented in FIG. 1 the lead bearing feed material of the type mentioned above, and as more particularly referred to herein, lead sulfate waste battery material, is charged into the leach vessel 1 through line 10. An aqueous leach solution containing ammonium carbonate is fed from the gas recovery stage 4, or recycled therefrom to the leach zone 1 through line 12. The leach vessel 1, diagrammatically represented herein, is preferably a conventional stationary tank, provided with a suitable mechanical mixer unit that continuously intermixes the described leach solution and lead containing feed material. It is to be noted that a rotary type of leach vessel can here be utilized as an equivalent; also, although only one such leach vessel is disclosed in the diagrammatic drawings, it may be advantageous to provide two or more leach vessels arranged in parallel. In addition, the leaching procedure may be carried out as either a batch or continuous operation. However, it is considered preferable that same be conducted as a continuous operation in which solid feed is charged to one or more leach vessels co-currently to the leach solution.

This initial leaching operation is preferably carried out at a pressure corresponding to the equilibrium vapor pressure of the several components of the leach solution, and thus such pressure will depend upon the composition of that solution, as well as the leaching temperature required for this type of lead bearing feed materials. Specific pressures and temperatures in this regard are referred to below.

It is apparent that the composition and concentration of the leach solution employed in any given run of the process will depend upon the particular type of the lead bearing material being leached in this initial stage. Similarly, the residence time of the material so being leached will depend upon the composition of the feed material, the composition and concentration of the initial leach solution, and the ammonium carbonate content of the aqueous leach liquor. All of these factors can be readily determined by one skilled in the art in this industry.

In any event, and with regard again to FIG. 1, on completion of the leaching operation, leach slurry is withdrawn from the leach vessel 1 through line 13 whereby it is introduced into the liquid-solid separation vessel 2. The latter may include such mechanical expedients as a vacuum filter or its equivalent, where the lead bearing solids, such as lead carbonate in the instant case, are separated from the ammonium sulfate solution. It is, of course, to be understood that the reaction which takes place with regard to this leaching stage involves one between lead sulfate and ammonium carbonate which together, in an aqueous solution, form lead carbonate on the one hand and ammonium sulfate on the other.

In any event, the solid components from the liquid-solid separation zone and comprising primarily lead carbonate, are conveyed through line 14 into a thermal decomposition vessel 5 where the necessary heat is supplied to decompose the lead carbonate into lead oxide and carbon dioxide. The lead bearing solids are then delivered through line 21, representing primarily lead oxide. The latter can then be submitted to a smelting and refining furnace to reduce that oxide to metallic lead.

As to the carbon dioxide resulting from the decomposition procedure of stage 5, that $CO_2$ gas exits from vessel 5 via line 22, the latter carrying such $CO_2$ to the gas recovery vessel 4. The solution from the liquid-solid separation vessel 2, containing ammonium sulfate as a result of the reaction mentioned above, is directed into the ammonium sulfate recovery vessel 3 via line 25.

This recovery vessel 3 may be either a spray drier of known type or consist of apparatus enabling suitable crystallization. In either case, the ammonium sulfate is recovered as a by-product solid, while the aqueous portion is volatilized to a gaseous mixture of water, ammonium and carbon dioxide. The carbon dioxide results from an excess of ammonium carbonate carried over from the leach stage. It will be noted that vessel 3, representing the ammonium sulfate recovery phase, is subjected to heat via a fuel and air mixture feed through line 35, the combustion products thereof exiting through line 36. This combustion is, of course, for heating purposes only and would be external to, or aside from any reaction within, the ammonium sulfate recovery chamber 3.

The chemical components resident in vessel 3 are ammonium sulfate, water, ammonia and carbon dioxide, as indicated above. These products, comprising a mixture of such particulated solids and gases are delivered to a solid-gas separator 6 through line 18. That separator may be of any conventional type well known to the art, such as a cyclone separator or the baghouse type of separator. We prefer the use of the latter in that the same will recover in excess of 99 percent of the solid matter contained in this solid-gaseous mixture. The ammonium sulfate particles recovered in the separator 6, and representing a recovered by-product useful as a fertilizer, are delivered to storage through line 24.

Referring back to the gas recovery unit 4 which receives $CO_2$ from solids decomposition vessel 5, the former also receives some ammonia and $CO_2$ from the solid-gas separator 6 through line 29. Make-up ammonia and additional make-up $CO_2$ are fed to gas recovery vessel 4 via lines 32 and 33. At any rate, the ammonium carbonate in vessel 4, and in aqueous solution, is recycled via line 12 to the initial leach stage. It is thus seen that recycle of $CO_2$ in the manner just described is an important facet of the instant process for it enables additional formation of ammonium carbonate for the purposes just explained.

With regard to FIG. 2, the same represents what we prefer to term the "open" system of our method. In this open system for $CO_2$ recovery shown in this FIG. 2, the solid component from the liquid-solid separation zone 2, and consisting of lead carbonate, is discharged directly out of the system as furnace feed. Such carbonate is suitable for submission directly to a smelting and refining furnace for conversion of such lead carbonate to metallic lead. If such solid particles contain excess moisture, as may be the case upon discharge from zone 2, then it may be first dried in a conventional solids drier, known to the art, and prior to further refining to achieve the ultimate metallic lead.

In this system of FIG. 2, the combustion products of the fuel-air mixture are not discharged through line 36 as in FIG. 1, but are directed, via line 46, to the gas recovery vessel 4. Such combustion gases, of course, contain a substantial amount of carbon dioxide and it is the recovery of that $CO_2$ that is achieved in this operation of our system as depicted in FIG. 2.

The $CO_2$ thus discharged into vessel 4 in the manner just explained is adsorbed in an ammonium hydroxide solution forming an ammonium carbonate solution with the latter being recycled to the leach stage through line 12. All the remaining process stages are similar to that shown in FIG. 1 and FIG. 2. Thus, with the exception of line 46, all elements bear the same numerical designations as those of FIG. 1. Again, the furnace feed product of FIG. 2 is lead carbonate because of omission of the solids decomposition vessel 5, whereas in the procedure of FIG. 1 and due to that zone or vessel 5, the furnace feed product is lead oxide.

In either system, however, it is important to note that not only is $CO_2$ recycled for the formation of ammonium carbonate, which in turn is recycled to the leach stage, but also that ammonium sulfate is produced in substantial quantity as a valuable by-product.

Also, and in each alternate system, the involved sulfur component of the lead sulfate feed stream is, as stated, converted to ammonium sulfate, thus to completely obviate any emission of $SO_x$ to the atmosphere.

The following examples are further specific to the basic invention as formulated in the foregoing explanation.

EXAMPLE I

Here is illustrated an embodiment of the process of the invention in which lead sulfate (1650 lbs./hr.) is converted to lead carbonate, then decomposed to lead oxide by the closed, indirect heat exchange system for $CO_2$ recovery as shown in FIG. 1. The following identifies each specific stage.

A. Leach Stage:

4500 lbs./hr. of lead compounds containing 2480 lbs. of lead sulfate is charged into a suitable leaching vessel equipped with a conventional liquid-solids agitator. At the same time 360 gal./hr. of an ammonium carbonate water solution (218 grams/liter) is added to the leach vessel. These two streams enter and pass co-currently through the system, remaining in agitated contact for approximately 30 minutes before leaving the leach stage. During this time the lead sulfate is converted to lead carbonate (for this example 100 percent conversion of the sulfate has been used — the conversion is slightly less in actual practice), with the further conversion of ammonium carbonate to ammonium sulfate (300 grams/liter). The leach vessel is maintained at a pressure of about 5 to about 100 psig, and at a temperature of from about 20° to about 80°C. The closed leach vessel permits leaching to be carried out at an elevated temperature in order to utilize faster reaction rates. Also, since it is closed with respect to the gaseous phase, solvent vapor losses are eliminated.

The leach reaction is as follows:

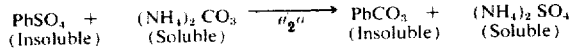

B. Liquid-Solid Separation Stage:

The leach slurry leaving the leaching vessel contains the ammonium sulfate and lead carbonate admixture; the same are then passed through a conventional filter.

C. Solids Decomposition Stage:

The solid particulates (lead carbonate), in admixture with approximately 10 percent aqueous solution, enter a reactor in which a first stage is used to dry and preheat the solids to about 400° F. In a second stage the solids are heated further by indirect methods (for example — an indirect gas fired rotary calciner) to about 600° F. wherein the (solid) lead carbonate decomposes to lead oxide plus $CO_2$ as follows:

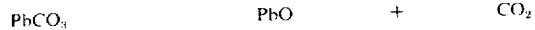

(Solid)         (Solid)         (Gas)

D. Ammonium Sulfate Recovery Stage:

The filtrate from stage or vessel 2 (liquid-solid separation) is sent to either a crystallizer system or a spray drier for recovery of the solids portion, the ammonium sulfate, the gas phases thereof consisting essentially of $NH_3$, $CO_2$ and water vapor.

The reactions occurring in the above phase of the method are:

The ammonium carbonate is a carry-over from the leaching stage when using excess reactants.

E. Gas Recovery:

This stage serves two main functions: (1) the recovery of $NH_3$, $CO_2$ and $H_2O$ by absorption which reconstitutes the leach solution for recycle and (2) removal of excess water by stripping the absorber solution.

EXAMPLE II (Commercial Operation)

A typical month's operation would consist of the following:

a. "Paste" — 3250 tons at 55 percent lead sulfate
b. "Mud" — 430 tons at 60 percent lead sulfate
c. Total lead sulfate — 2045 tons lead sulfate The involved reactions, in estimated tonnage figures, are as follows:

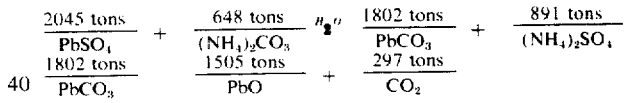

The content of ammonia and $CO_2$ are estimated as follows:

a. Ammonia $(NH_4)CO_3$, Ammonium Carbonate — contains 35.5 percent ammonia by weight, therefore 648 tons contains 230 tons of ammonia.

b. $CO_2$ $(NH_4)_2CO_3$ — contains 45.8 percent $CO_2$ by weight, therefore 648 tons contains 297 tons of $CO_2$.

It is further considered that operation of the involved process, and in accordance with the foregoing tonnages and percentages of chemicals utilized, would produce a recovery total of 2500 tons of metallic lead over such one month's production time.

From the foregoing description of our invention, the various advantages of this novel system should be apparent. Firstly, the method or process is one which self-generates its own $CO_2$ which is utilized for the production of ammonium carbonate and ultimate recycle to the leach stage. Secondly, and as above explained, the emission of sulfur oxide is reduced by 80 to 90 percent, thus to demonstrate that practice of the process will comply with various statutory and regulatory restrictions regarding control of air pollution. Finally, a commercial by-product is produced, this being ammonium sulfate, a valuable fertilizer material. As to the last factor, production of such a by-product naturally substan-

We claim as our invention:

1. A process for the recovery of more valuable products from lead sulfate bearing material, which comprises leaching said material with ammonium carbonate solution to form lead carbonate and ammonium sulfate, separating the effluent of the leaching step into a solid lead carbonate product and a liquid product comprising a solution of ammonium sulfate and carbon dioxide, recovering carbon dioxide from at least one of said products and reacting the same with ammonia to form ammonium carbonate, and supplying the latter in aqueous solution to the aforesaid leaching step.

2. The process of claim 1 further characterized in that said carbon dioxide is formed by thermal decomposition of said lead carbonate product.

3. The process of claim 1 further characterized in that said carbon dioxide is obtained by vaporization from said liquid product.

4. The process of claim 1 further characterized in that at least a portion of said ammonia is derived from said ammonium sulfate solution.

5. A process for the recovery of more valuable products from lead sulfate bearing material, which comprises leaching said material with ammonium carbonate solution to form lead carbonate and ammonium sulfate, separating the lead carbonate from the ammonium sulfate and recovering the latter, thermally decomposing the lead carbonate to form lead oxide and carbon dioxide, reacting the carbon dioxide with ammonia to form ammonium carbonate, and supplying the latter in aqueous solution to the aforesaid leaching step.

6. The process of claim 5 further characterized in that said lead oxide is reduced to metallic lead.

7. A process for the recovery of more valuable products from lead sulfate bearing material, which comprises leaching said material with ammonium carbonate solution to form lead carbonate and ammonium sulfate, separating the effluent of the leaching step into solid lead carbonate and a solution of ammonium sulfate, ammonia and carbon dioxide, separating a gas containing ammonia and carbon dioxide from the last-named solution and recovering the ammonium sulfate content of this solution, thermally decomposing said solid lead carbonate into lead oxide and carbon dioxide, commingling the latter with said gas and reacting the carbon dioxide and ammonia content of the resultant mixture to form ammonium carbonate, and supplying the latter in aqueous solution to the aforesaid leaching step.

8. The process of claim 7 further characterized in that said lead oxide is reduced to metallic lead.

9. A process for the recovery of more valuable products from lead sulfate bearing material, which comprises leaching said material with ammonium carbonate solution to form lead carbonate and ammonium sulfate, separating the effluent of the leaching step into solid lead carbonate and a solution of ammonium sulfate, ammonia and carbon dioxide, vaporizing from the last-named solution, by heat exchange thereof with $CO_2$-containing combustion products, a gas containing ammonia and carbon dioxide, separating said gas from the ammonium sulfate and commingling the same with the combustion products issuing from said heat exchange, reacting the ammonia and carbon dioxide content of the resultant gas mixture to form ammonium carbonate, and supplying the latter in aqueous solution to the aforesaid leaching step.

10. The process of claim 8 further characterized in that said lead carbonate is reduced to metallic lead.

* * * * *